United States Patent
Mera et al.

(10) Patent No.: US 9,243,638 B2
(45) Date of Patent: Jan. 26, 2016

(54) MOTOR-DRIVEN COMPRESSOR INCLUDING A ROTOR CORE HAVING A REFRIGERANT PASSAGE

(71) Applicant: KABUSHIKI KAISHA TOYOTA JIDOSHOKKI, Kariya-shi, Aichi-ken (JP)

(72) Inventors: Minoru Mera, Kariya (JP); Hiroshi Fukasaku, Kariya (JP); Shuji Takimoto, Kariya (JP); Yumin Hishinuma, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 112 days.

(21) Appl. No.: 14/072,957

(22) Filed: Nov. 6, 2013

(65) Prior Publication Data
US 2014/0134014 A1    May 15, 2014

(30) Foreign Application Priority Data

Nov. 15, 2012  (JP) .................................. 2012-251142

(51) Int. Cl.
*H02K 15/10* (2006.01)
*F04C 23/02* (2006.01)
(Continued)

(52) U.S. Cl.
CPC ............. *F04C 23/02* (2013.01); *F04C 18/0207* (2013.01); *F04C 18/0215* (2013.01);
(Continued)

(58) Field of Classification Search
CPC . F04D 29/5806; F04D 29/045; F04B 39/121; F04B 39/14; F04B 35/04; F04B 2201/0801; F04C 18/0215; F04C 29/045; F04C 29/047; F04C 23/02; F04C 23/008; F04C 18/0207; H02K 7/14; H02K 1/20; H02K 1/32; H02K 9/19; H02K 9/005
USPC ................ 417/371, 410.5, 366, 410.3, 410.1; 310/54, 61
See application file for complete search history.

(56) References Cited

U.S. PATENT DOCUMENTS

| 4,592,703 A | 6/1986 | Inaba et al. |
| 5,064,356 A | 11/1991 | Horn |

(Continued)

FOREIGN PATENT DOCUMENTS

| CN | 1060514 A | 4/1992 |
| CN | 1296551 A | 5/2001 |

(Continued)

OTHER PUBLICATIONS

Communication dated Aug. 4, 2015 from the State Intellectual Property Office of P.R. of China issued in Chinese application No. 201310560084.X.

*Primary Examiner* — Justin Jonaitis
*Assistant Examiner* — Stephen Mick
(74) *Attorney, Agent, or Firm* — Sughrue Mion, PLLC (57) ABSTRACT

A motor-driven compressor includes a compression unit, an electric motor, a motor drive circuit, a housing, and a first end plate. The electric motor includes a rotation shaft, a rotor provided with a rotor core, and a stator. The stator includes a state core and a coil. The coil includes first and second coil ends. The rotor core includes a refrigerant passage having a first opening that opens in the compression unit side. The first opening includes a first radially outer region. First and second regions in the housing are in communication through the refrigerant passage. The first end plate includes a first communication port arranged on a first region side end of the rotor core. The first region and the refrigerant passage are in communication through the first opening and first communication port. The first radially outer region is covered by the first end plate.

8 Claims, 3 Drawing Sheets

(51) Int. Cl.
*F04C 18/02* (2006.01)
*H02K 1/32* (2006.01)
*F04C 23/00* (2006.01)
*F04C 29/04* (2006.01)
*H02K 1/20* (2006.01)
*H02K 7/14* (2006.01)

(52) U.S. Cl.
CPC ............. *F04C23/008* (2013.01); *F04C 29/045* (2013.01); *H02K 1/20* (2013.01); *H02K 1/32* (2013.01); *H02K 7/14* (2013.01)

(56) References Cited

U.S. PATENT DOCUMENTS

| | | | |
|---|---|---|---|
| 5,889,342 A * | 3/1999 | Hasebe et al. | 310/54 |
| 6,375,438 B1 | 4/2002 | Seo | |
| 6,547,538 B1 * | 4/2003 | Tamura et al. | 417/415 |
| 2004/0179967 A1 | 9/2004 | Morozumi et al. | |
| 2007/0178723 A1 * | 8/2007 | Kataoka et al. | 439/76.2 |
| 2009/0148314 A1 | 6/2009 | Koitabashi et al. | |
| 2010/0074774 A1 * | 3/2010 | Kojima et al. | 417/410.3 |
| 2010/0314955 A1 * | 12/2010 | Masuda et al. | 310/56 |
| 2011/0033324 A1 | 2/2011 | Schaefer et al. | |
| 2011/0074233 A1 * | 3/2011 | Okada et al. | 310/54 |
| 2012/0007455 A1 * | 1/2012 | Tanaka | 310/66 |
| 2012/0251355 A1 * | 10/2012 | Fukasaku | 417/410.1 |

FOREIGN PATENT DOCUMENTS

| | | |
|---|---|---|
| CN | 101483367 A | 7/2009 |
| CN | 101630880 A | 1/2010 |
| CN | 102483065 A | 5/2012 |
| EP | 1865201 A1 | 12/2007 |
| JP | 56-39875 U | 4/1981 |
| JP | 63-9474 U | 1/1988 |
| JP | 8-28476 A | 1/1996 |
| JP | 2006-207422 A | 8/2006 |
| JP | 2008-228395 A | 9/2008 |
| JP | 2009203904 A | 9/2009 |
| JP | 2009281280 A | 12/2009 |
| JP | 2012-52551 A | 3/2012 |
| JP | 2012057533 A | 3/2012 |
| KR | 10-2011-0128680 A | 11/2011 |
| KR | 10-2012-0117552 A | 10/2012 |

* cited by examiner

MOTOR-DRIVEN COMPRESSOR INCLUDING A ROTOR CORE HAVING A REFRIGERANT PASSAGE

BACKGROUND OF THE INVENTION

The present invention relates to a motor-driven compressor.

A motor-driven compressor is provided with a housing including a cylindrical motor housing, which has a closed end, and a cylindrical discharge housing, which has a closed end and is coupled to the open end of the motor housing. An inverter cover is coupled to the motor housing. A rotation shaft is accommodated in the motor housing. The motor housing accommodates a compression unit, which includes a compression chamber that compresses a refrigerant, and an electric motor, which drives the compression unit. Further, a compartment formed between the motor housing and the inverter cover accommodates a motor drive circuit that drives the electric motor.

The electric motor includes a rotor, which rotates integrally with the rotation shaft, and a stator, which surrounds the rotor. The stator is fixed to the inner surface of the motor housing and includes an annular stator core and coils. Teeth extend from the stator core, which is fixed to the inner surface of the motor housing. The coils are arranged in slots defined between the teeth. The rotor includes a rotor core, which is fixed to the rotation shaft, and permanent magnets, which are embedded in the rotor core.

The motor housing includes a suction port, which is connected to an external refrigerant circuit. A discharge chamber is formed between the motor housing and the discharge housing. The discharge housing includes a discharge port, which is connected to the external refrigerant circuit. Refrigerant, which is drawn into the motor housing through the suction port, flows toward the compression chamber through a passage formed between an outer surface of the stator core and the inner surface of the motor housing. The compression chamber draws in and compresses the refrigerant. The compressed refrigerant is discharged from the compression chamber into the discharge chamber. The refrigerant then flows out of the discharge chamber through the discharge port, enters the external refrigerant circuit, and returns to the motor housing through the suction port.

The refrigerant flowing through the passage between the outer surface of the stator core and the inner surface of the motor housing cools the stator core. However, the refrigerant cannot sufficiently cool the rotor core. Thus, the entire electric motor cannot be sufficiently cooled.

Korean Laid-Open Patent Publication No. 2011-128680 describes an example of an electric motor including a rotor core provided with a plurality of refrigerant passages. The refrigerant passages extend in an axial direction through the rotor core. Refrigerant drawn into the motor housing from the suction port flows through the refrigerant passages. The refrigerant flowing through each refrigerant passage cools the rotor core and improves the cooling performance of the entire electric motor.

However, there is a demand for an electric motor having a cooling performance that is further improved from that of the electric motor described in Korean Laid-Open Patent Publication No. 2011-128680.

SUMMARY OF THE INVENTION

It is an object of the present invention to provide a motor-driven compressor that improves the cooling performance of the electric motor.

To achieve the above object, one aspect of the present invention is a motor-driven compressor including a compression unit, an electric motor, a motor drive circuit, a housing, and a first end plate. The electric motor includes a rotation shaft coupled to the compression unit, a rotor rotated integrally with the rotation shaft and including a rotor core, and a stator surrounding the rotor. Rotation of the rotation shaft drives the compression unit. The stator includes a stator core, which is provided with teeth, and a coil, which is arranged in a slot between the teeth. The coil includes a first coil end, which is located at a compression unit side, and a second coil end, which is located at an opposite side of the compression unit side. The rotor core includes a refrigerant passage extending through the rotor core along an axial direction of the rotation shaft. The refrigerant passage includes a first opening that opens in the compression unit side. The first opening includes a first radially outer region located at an outer side of the first opening in the radial direction of the rotation shaft. A motor drive circuit drives the electric motor. A housing accommodates the electric motor and the compression unit. The stator is fixed to an inner surface of the housing. The housing has an interior including a first region in which the first coil end is located and a second region in which the second coil end is located. The first region and the second region are in communication through the refrigerant passage of the rotor core. The housing includes a suction port connected to an external refrigerant circuit. The suction port opens in the second region. A first end plate is arranged on a first region side end of the rotor core. The first end plate includes a first communication port. The first region and the refrigerant passage are in communication through the first opening and the first communication port. The first radially outer region is covered by the first end plate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of the present invention will now be described with reference to FIGS. 1 to 3.

Figure 1:
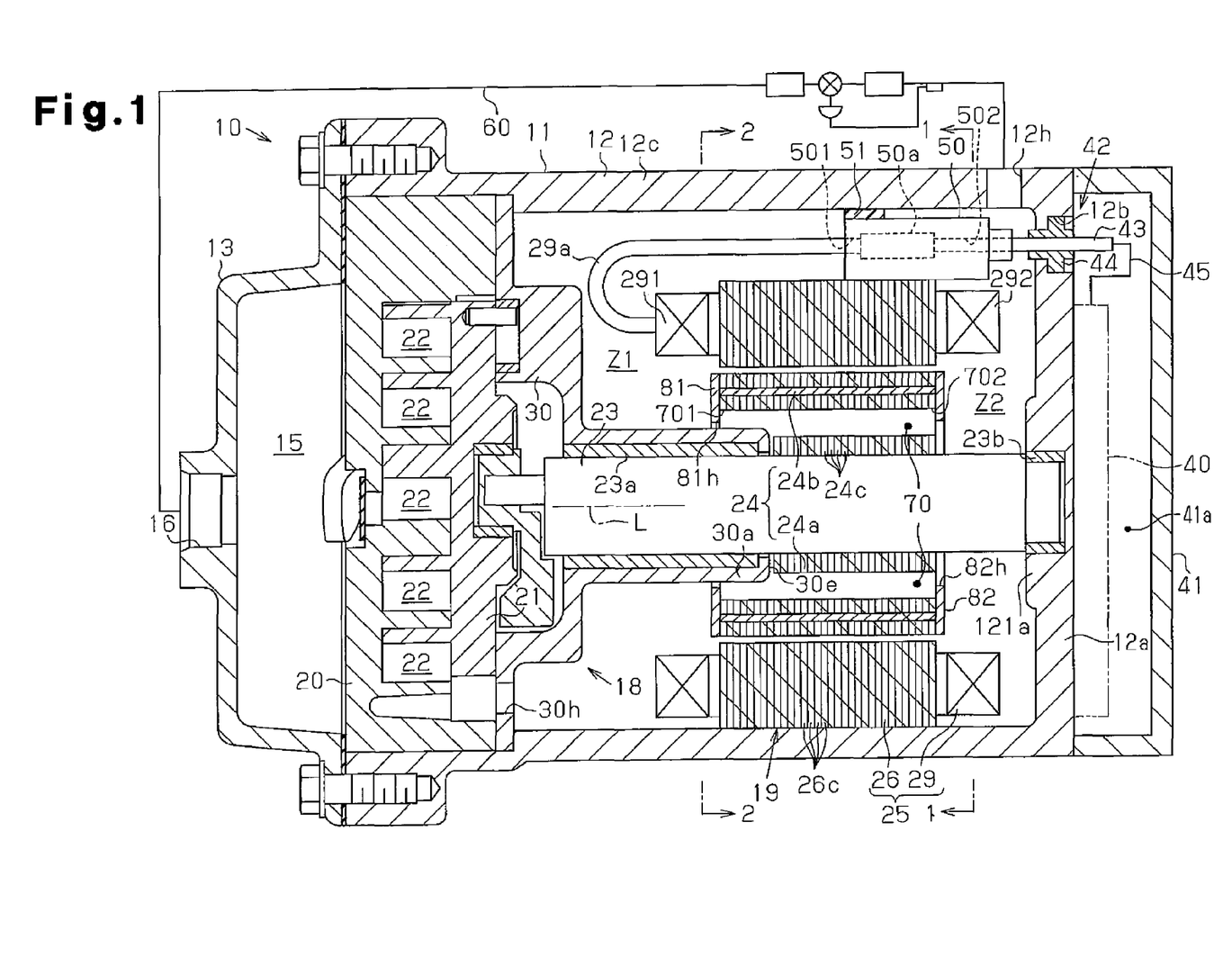
FIG. 1 is a cross-sectional view of a motor-driven compressor according to one embodiment of the present invention.

Referring to FIG. 1, a motor-driven compressor 10 is provided with a housing 11 including a cylindrical motor housing 12 and a cylindrical discharge housing 13. The motor housing 12 is formed from a metal material (aluminum in the present embodiment) and includes a closed end that defines an end wall 12a. The discharge housing 13, which is coupled to an open end (left end in FIG. 1) of the motor housing 12, is formed from a metal material (aluminum in the present embodiment) and includes a closed end. A discharge chamber 15 is formed between the motor housing 12 and the discharge housing 13. A cylindrical inverter cover 41, which is formed from a metal material (aluminum in the present embodiment) and includes a closed end, is coupled to the end wall 12a of the motor housing 12.

The motor housing 12 accommodates a rotation shaft 23.

Further, the motor housing 12 accommodates a compression unit 18 and an electric motor 19 that are arranged next to each other in the horizontal direction and along a direction in which the axis L of the rotation shaft 23 extends (axial direction). The electric motor 19 is arranged in the motor housing 12 closer to the end wall 12a than the compression unit 18, that is, at the right side of the compression unit 18 as viewed in FIG. 1. An accommodation compartment 41a is formed between the end wall 12a of the motor housing 12 and the inverter cover 41. The accommodation compartment 41a accommodates a motor drive circuit 40 (shown by broken lines in FIG. 1), which drives the electric motor 19. The motor drive circuit 40 is thermally coupled to the end wall 12a so that the motor drive circuit 40 is in contact with an outer surface of the end wall 12a. In the present embodiment, the compression unit 18, the electric motor 19, and the motor drive circuit 40 are arranged next to one another in this order along the axial direction of the rotation shaft 23.

The compression unit 18 includes a fixed scroll 20, which is fixed to the motor housing 12, and a movable scroll 21, which is engaged with the fixed scroll 20. A compression chamber 22 having a variable volume is formed between the fixed scroll 20 and the movable scroll 21. A cylindrical shaft support 30 is arranged in the motor housing 12 between the electric motor 19 and the compression unit 18 to support a first end of the rotation shaft 23. A bearing holder 30a is arranged in the shaft support 30. The bearing holder 30a holds a plain bearing 23a, which supports the first end of the rotation shaft 23 in a rotatable manner. The end wall 12a also includes a shaft support 121a. The shaft support 121a holds a plain bearing 23b that supports a second end of the rotation shaft 23 in a rotatable manner. The shaft support 30 and the end wall 12a of the motor housing 12 support the rotation shaft 23 with the plain bearings 23a and 23b so that the rotation shaft 23 is rotatable.

A suction port 30h is formed in a peripheral portion of the shaft support 30. The suction port 30h is in communication with an area outside the peripheral portion of the movable scroll 21, that is, an area between the fixed scroll 20 and the movable scroll 21. Accordingly, the interior of the motor housing 12 is in communication with the compression chamber 22 through the suction port 30h.

A stator 25 is fixed to the inner surface of the motor housing 12. The stator 25 includes an annular stator core 26, teeth 27 (refer to FIGS. 2 and 3), and coils 29. The annular stator core 26 is fixed to the inner surface of the motor housing 12. The teeth 27 extend from the stator core 26. The coils 29 are arranged in slots 27s defined between the teeth 27. Core plates 26c are stacked to form the stator core 26. Each core plate 26c is a magnetic body (electromagnetic steel plate). A rotor 24 is arranged at the inner side of the stator 25. The rotor 24 includes a rotor core 24a, which is fixed to the rotation shaft 23, and permanent magnets 24b, which are embedded in the rotor core 24a. Core plates 24c are stacked to form the rotor core 24a. Each core plate 24c is a magnetic body (electromagnetic steel plate).

Figure 2:
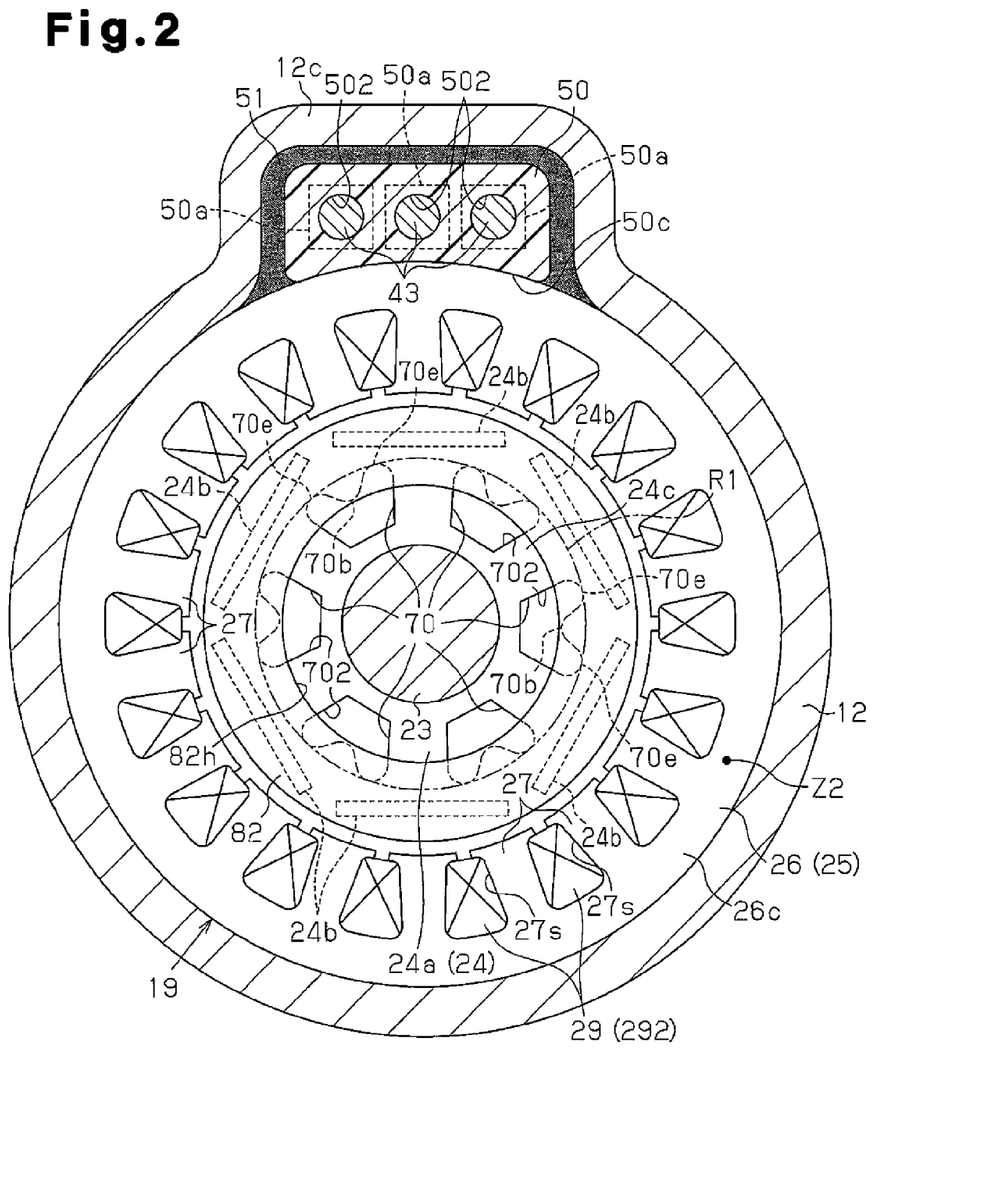
FIG. 2 is a cross-sectional view taken along line 1-1 in FIG. 1.
Figure 3:
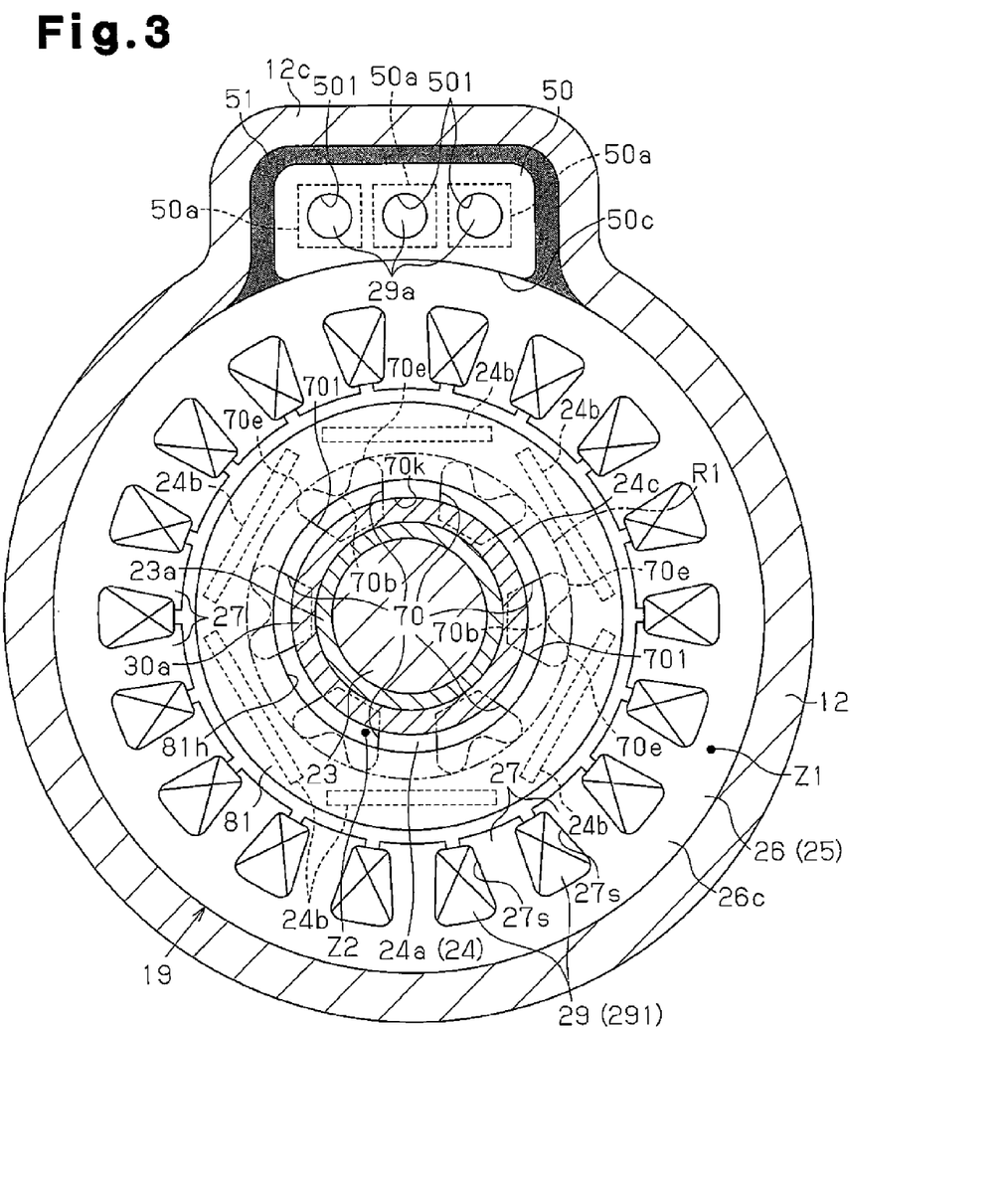
FIG. 3 is a cross-sectional view taken along line 2-2 in FIG. 1.

Referring to FIGS. 2 and 3, the motor housing 12 includes an upper section located at the upper side of the motor housing 12. A portion of the upper section defines a passage formation portion 12c that outwardly projects in the radial direction of the rotation shaft 23. The passage formation portion 12c extends straight along the axial direction of the rotation shaft 23. A cluster block 50, which is box-shaped and formed from a synthetic resin, is arranged between the passage formation portion 12c and the stator core 26. Connection terminals 50a are arranged in the cluster block 50. The cluster block 50 has an outer bottom surface 50c that is arcuate to conform to the outer surface of the stator core 26. The outer bottom surface 50c extends parallel to the axial direction of the stator core 26.

Referring to FIG. 1, each coil 29 includes a first coil end 291, which is located at the side closer to the compression unit 18, and a second coil end 292, which is located at the side opposite to the compression unit 18. The interior of the motor housing 12 includes a first region Z1, in which the first coil end 291 is arranged, and a second region Z2, in which the second coil end 292 is arranged. A resin filler 51 is arranged between the passage formation portion 12c and the cluster block 50. The filler 51 closes the gap between the passage formation portion 12c and the cluster block 50 to disconnect the first region Z1 from the second region Z2 through the gap.

An initiating end of a lead wire 29a for a U phase, a V phase, or a W phase (only one shown in FIG. 1) extends from the first coil end 291. The initiating end of each lead wire 29a extends through a corresponding first insertion hole 501 in the cluster block 50 and is electrically connected to one of the connection terminals 50a.

A through hole 12b extends through the end wall 12a of the motor housing 12. A seal terminal 42 is arranged in the through hole 12b. The seal terminal 42 includes three metal terminals 34, which are electrically connected to the motor drive circuit 40, and three glass insulators 44, which insulate the metal terminals 43 from the end wall 12a while fixing the metal terminals 43 to the end wall 12a. FIG. 1 shows only one metal terminal 43 and one insulator 44. Each metal terminal 43 has a first end and a second end. The first end of the metal terminal 43 is electrically connected to the motor drive circuit 40 by a cable 45. The second end of the metal terminal 43 is extended through a second insertion hole 502 in the cluster block 50 and is electrically connected to one of the connection terminals 50a.

The motor housing 12 includes a suction port 12h, which opens in the motor housing 12 at the second region Z2. The suction port 12h is connected to an external refrigerant circuit 60. The closed end (left end as viewed in FIG. 1) of the discharge housing 13 defines an end wall including a discharge port 16 that is connected to the external refrigerant circuit 60.

Referring to FIGS. 2 and 3, a plurality of (six in the present embodiment) refrigerant passages 70 extend through the rotor core 24a in the axial direction of the rotation shaft 23. The first region Z1 and the second region Z2 are in communication through the refrigerant passages 70. Each refrigerant passage 70 includes a first opening 701, which opens in the first region Z1, and a second opening 702, which opens in the second region Z2. The refrigerant passages 70 are spaced apart from one another and arranged along the circumferential direction of the rotation shaft 23. Each refrigerant passage 70 includes a radially outer region located at the outer side of the refrigerant passage 70 in the radial direction of the rotation shaft 23. The rotor core 24a includes a projection 70b in the radially outer region of each refrigerant passage 70. The projection 70b extends along the axial direction of the rotation shaft 23. Each refrigerant passage 70 has recesses located on circumferentially opposite sides of the corresponding projection 70b. Each recess includes an outermost portion 70e, which is located at the outermost side of the recess in the radial direction of the rotation shaft 23. The outermost portion 70e corresponds to the outermost portion of the corresponding refrigerant passage 70.

Each core plate 24c undergoes a punching process to form the refrigerant passages 70. Referring to FIG. 3, the refrigerant passages 70 include an annular cutout portion 70k located at the first region side of the refrigerant passages 70. Each refrigerant passage 70 is in communication with the adjacent refrigerant passage 70 in the circumferential direction of the rotation shaft 23 through the cutout portion 70k. The cutout portion 70k is formed by cutting out the inner circumferential surface of the core plates 24c stacked in the first region side. The inner circumferential side of the cutout portion 70k is located at the outer side of the inner circumferential surface of each refrigerant passage 70.

A circular first end plate 81 is coupled to the first region side end of the rotor core 24a. The first end plate 81 includes an inner circumferential surface that forms a first communication port 81h. The first region Z1 is in communication with the refrigerant passages 70 through the first communication port 81h and the first openings 701. The first end plate 81 has an inner diameter (i.e., outer diameter of first communication port 81h) that is smaller than the diameter of a hypothetical circle R1 that lies along the outermost portions 70e of the recesses located at opposite sides of the projection 70b in each refrigerant passage 70. Thus, the inner circumference of the first end plate 81 defining the first communication port 81h is located at the inner side of the hypothetical circle R1 in the radial direction of the rotation shaft 23. Consequently, the first end plate 81 covers the radially outer region (first radially outer region) of each first opening 701. The first radially outer region is included in the first opening 701 and located at the outer side of the first opening 701 in the radial direction of the rotation shaft 23. In the present embodiment, the inner diameter of the first end plate 81 is set so that the inner circumferential surface of the first end plate 81 defining the first communication port 81h is located at the inner side of each projection 70b in the radial direction of the rotation shaft 23. Further, the inner diameter of the first end plate 81 is larger than the outer diameter of the bearing holder 30a in the shaft support 30.

Referring to FIG. 2, a circular second end plate 82 is coupled to the second region side end of the rotor core 24a. The second end plate 82 includes an inner circumferential surface that forms a second communication port 82h. The second region Z2 is in communication with the refrigerant passages 70 through the second communication port 82h and the second openings 702. The second end plate 82 has an inner diameter (i.e., outer diameter of second communication port 82h) that is smaller than the diameter of the hypothetical circle R1 that lies along the outermost portions 70e of the recesses located at opposite sides of the projection 70b in each refrigerant passage 70. Thus, the inner circumference of the second end plate 82 defining the second communication port 82h is located at the inner side of the hypothetical circle R1 in the radial direction of the rotation shaft 23. Consequently, the second end plate 82 covers the radially outer region (second radially outer region) of each second opening 702. The second radially outer region is included in the second opening 702 and located at the outer side of the second opening 702 in the radial direction of the rotation shaft 23. In the present embodiment, the inner diameter of the second end plate 82 is set so that the inner circumferential surface of the second end plate 82 defining the second communication port 82h is located at the inner side of each projection 70b in the radial direction of the rotation shaft 23. The first end plate 81 and the second end plate 82 prevent separation of the permanent magnets 24b from the rotor 24 in the axial direction of the rotation shaft 23.

As shown in FIG. 3, a portion (end wall 30e) of the bearing holder 30a in the shaft support 30 is inserted into the cutout portion 70k through the first communication port 81h defined by the first end plate 81. The outer surface of the bearing holder 30a is located at the outer side of the inner surface of each refrigerant passage 70 in the radial direction of the rotation shaft 23. Thus, the bearing holder 30a is inserted into the refrigerant passages 70 from the first region side so that the peripheral portion of the bearing holder 30a is located at the radially inner region of each refrigerant passage 70. The radially inner region is included in the refrigerant passage 70 and located at the inner side of the refrigerant passage 70 in the radial direction of the rotation shaft 23. The end wall 30e of the bearing holder 30a is arranged at the radially inner regions of the refrigerant passages 70. As shown in FIG. 1, a clearance between the bearing holder 30a and the rotation shaft 23 is in communication with the refrigerant passages 70.

The operation of the present embodiment will now be described.

In the motor-driven compressor 10, when the electric motor 19 is supplied with power regulated by the motor drive circuit 40, the rotor 24 is rotated with the rotation shaft 23 at a controlled rotation speed. This decreases the volume of the compression chamber 22 between the fixed scroll 20 and the movable scroll 21 in the compression unit 18. Then, refrigerant is drawn from the external refrigerant circuit 60 through the suction port 12h into the motor housing 12.

The filler 51 disconnects the first region Z1 and the second region Z2 through the gap between the passage formation portion 12c and the cluster block 50. Thus, the refrigerant drawn into the motor housing 12 through the suction port 12h flows into the second region Z2 and cools the second coil ends 292 of the coils 29. The refrigerant in the second region Z2 also flows along the end wall 12a. This cools the end wall 12a and the motor drive circuit 40, which is thermally coupled to the end wall 12a.

The refrigerant in the second region Z2 then flows into the refrigerant passages 70 through the second communication port 82h, defined by the second end plate 82, and the second openings 702. The refrigerant flowing through each refrigerant passage 70 cools the rotor core 24a. Further, the rotation of the rotor 24 centrifugally separates the refrigerant flowing through each refrigerant passage 70 into a gas phase refrigerant and oil. The centrifugal force produced by the rotation of the rotor 24 forces the separated oil toward the radially outer region of each refrigerant passage 70. The oil in the radially outer region of the each refrigerant passage 70 is collected in the recesses formed at opposite sides of the projection 70b in the refrigerant passage 70.

The second end plate 82 covers the radially outer region of each refrigerant passage 70. Thus, due to the second end plate 82, the oil in the second region side of each refrigerant passage 70 forced into the radially outer region by the centrifugal force produced when the rotor 24 rotates does not force away the refrigerant entering the refrigerant passages 70 from the second region Z2. Further, the oil collected in the recesses at opposite sides of the projection in each refrigerant passage 70 efficiently cools the rotor core 24a.

The first end plate 81 stops the flow of oil in the refrigerant passages 70 at the first opening 701 of each refrigerant passage 70. This temporarily collects the oil in each refrigerant passage 70 at the radially outer region of the corresponding first opening 701. The temporarily collected oil further efficiently cools the rotor core 24a. Further, the refrigerant flowing through each refrigerant passage 70 strikes the end wall 30e of the bearing holder 30a. Thus, in the present embodiment, the end wall 30e of the bearing holder 30a functions as a striking wall which the coolant flowing through the refrigerant passage 70 strikes. The oil that had not been centrifugally separated from the refrigerant by the rotation of the rotor 24 may be separated from the refrigerant when the refrigerant flowing through the refrigerant passage 70 strikes the end wall 30e of the bearing holder 30a. The separated oil further cools the rotor core 24a.

Further, the oil in each refrigerant passage 70 flows between the clearance between the bearing holder 30a and the rotation shaft 23. The oil in the clearance between the bearing holder 30a and the rotation shaft 23 lubricates and cools the plain bearing 23a.

The refrigerant further flows from the refrigerant passages 70 into the first region Z1 through the first openings 701 and the first communication port 81h defined by the first end plate 81. The refrigerant in the first region Z1 cools the first coil end 291 of each coil 29. In this manner, the cooling of the first coil ends 291 and the second coil ends 292 cools the stator core 26. The cooling of the stator core 26 and the rotor core 24a cools the entire electric motor 19.

The refrigerant in the first region Z1 is drawn through the suction port 30h into the compression chamber 22 and compressed. The compressed refrigerant is discharged to the discharge chamber 15. The discharged refrigerant is then returned from the discharge chamber 15 through the discharge port 16 and the external refrigerant circuit 60 to the motor housing 12.

The advantages of the present embodiment will now be described.

(1) The rotor core 24a includes the refrigerant passages 70 that extend through the rotor core 24a in the axial direction of the rotation shaft 23. The first region Z1 and the second region Z2 are in communication through the refrigerant passages 70. Further, the first end plate 81 that defines the first communication port 81h is arranged at the first region side end of the rotor core 24a. The first region Z1 and each refrigerant passage 70 are in communication with each other through the first opening 701 of the refrigerant passage 70 and the first communication port 81h. The first opening 701 includes the first radially outer region located at the outer side of the first opening 701 in the radial direction of the rotation shaft 23. The first end plate 81 covers the first radially outer region. Thus, the oil in the refrigerant passage 70 is temporarily collected in the first radially outer region of the refrigerant passage 70 by the first end plate 81 that closes the first opening 701. The temporarily collected oil further efficiently cools the rotor core 24a. This improves the cooling performance of the electric motor 19.

(2) The second end plate 82 that defines the second communication port 82h is arranged at the second region side end of the rotor core 24a. The second region Z2 and each refrigerant passage 70 are in communication with each other through the second opening 702 of the refrigerant passage 70 and the second communication port 82h. The second opening 702 includes the second radially outer region located at the outer side of the second opening 702 in the radial direction of the rotation shaft 23. The second end plate 82 covers the second radially outer region. Thus, the oil forced into the second radially outer region by the centrifugal force produced when the rotor 24 rotates does not force away the refrigerant entering the refrigerant passage 70 from the second region Z2. Further, the oil forced to the second radially outer region is easily collected in the refrigerant passage 70. As a result, the rotor core 24a is easily cooled by the oil, and the cooling performance of the electric motor 19 is further improved.

(3) Each refrigerant passage 70 includes a radially inner region located at the inner side of the refrigerant passage 70 in the radial direction of the rotation shaft 23. The end wall 30e of the bearing holder 30a is arranged in the radially inner region. Thus, the oil that had not been centrifugally separated from the refrigerant by the rotation of the rotor 24 may be separated from the refrigerant when the refrigerant flowing through the refrigerant passage 70 strikes the end wall 30e of the bearing holder 30a. The separated oil further cools the rotor core 24a, and the cooling performance of the electric motor 19 is further improved.

(4) The end wall 30e of the bearing holder 30a is used as the striking wall. The bearing holder 30a is a conventional structure of the motor-driven compressor 10. Thus, there is no need to use a separate component functioning as the striking wall, and the structure may be simplified. Further, the end wall 30e of the bearing holder 30a is located in the refrigerant passages 70. Thus, in comparison with when the end wall 30e of the bearing holder 30a is arranged outside the refrigerant passages 70, the motor-driven compressor 10 may be reduced in size in the axial direction of the rotation shaft 23.

(5) The clearance between the bearing holder 30a and the rotation shaft 23 is in communication with each refrigerant passage 70. Thus, oil flows from each refrigerant passage 70 to the clearance between the bearing holder 30a and the rotation shaft 23. The oil lubricates and cools the plain bearing 23a.

(6) The rotor core 24a includes the plurality of refrigerant passages 70 that are arranged along the circumferential direction of the rotation shaft 23. This improves the cooling performance of the electric motor 19 in comparison with when, for example, there is only one refrigerant passage 70.

(7) Each refrigerant passage 70 includes the radially outer region located at the outer side of the refrigerant passage 70 in the radial direction of the rotation shaft 23. The rotor core 24a includes the projection 70b in the radially outer region of each refrigerant passage 70. The projection 70b extends along the axial direction of the rotation shaft 23. Thus, the oil forced toward the radially outer region of each refrigerant passage 70 by the centrifugal force produced by the rotation of the rotor 24 is collected in the recesses formed at opposite sides of the projection 70b in the refrigerant passage 70. This suppresses local collection of the centrifugally separated oil in the refrigerant passage, and allows for the oil to efficiently cool the rotor core 24a.

(8) The compression unit 18, the electric motor 19, and the motor drive circuit 40 are arranged next to one another in this order along the axial direction of the rotation shaft 23. This allows for the motor drive circuit 40 to be cooled with the refrigerant drawn into the second region Z2 through the suction port 12h.

(9) The present embodiment allows for the rotor core 24a to be efficiently cooled. Thus, the cooling performance of the permanent magnets 24b embedded in the rotor core 24a may be improved. Consequently, there is no need for the permanent magnets 24b to be formed from a material that is highly heat resistant. This allows for cost reductions.

(10) The inner diameters of the first end plate 81 and the second end plate 82 are set so that the inner circumferential surfaces of the first end plate 81 and the second end plate 82 are located at the inner side of the projections 70b in the radial direction of the rotation shaft 23. This increases the area of the first end plate 81 and the second end plate 82 where oil is stopped in the recesses at the opposite sides of the projection 70b in each refrigerant passage 70 compared to when the inner circumferential surfaces of the first end plate 81 and the second end plate 82 are located at the outer side of the projections 70b in the radial direction of the rotation shaft 23. As a result, oil may be easily collected in the recesses at the opposite sides of the projection 70b in each refrigerant passage 70.

(11) The filler 51 closes the gap between the passage formation portion 12c and the cluster block 50 to disconnect the first region Z1 from the second region Z2 through the gap. Thus, the refrigerant drawn into the motor housing 12 through the suction port 12h easily flows to the second region Z2 and efficiently cools the motor drive circuit 40. Further, the amount of refrigerant that flows to the refrigerant passages 70 may be increased as much as possible, and the rotor core 24a may be efficiently cooled.

(12) The first end plate 81 and the second end plate 82 also function to prevent separation of the permanent magnets 24b from the rotor 24 in the axial direction of the rotation shaft 23. This allows for the number of components to be reduced in comparison with when first and second end plates are used in addition to end plates that prevent separation of the permanent magnets 24b from the rotor 24 in the axial direction of the rotation shaft 23.

It should be apparent to those skilled in the art that the present invention may be embodied in many other specific forms without departing from the spirit or scope of the invention. Particularly, it should be understood that the present invention may be embodied in the following forms.

In the above embodiment, the second end plate 82 may be omitted. In this case, there is a need to use a separate end plate for preventing separation of the permanent magnets 24b from the rotor 24 toward the second region side in the axial direction of the rotation shaft 23.

In the above embodiment, the first end plate 81 and the second end plate 82 may be provided in addition to end plates that prevent separation of the permanent magnets 24b from the rotor 24 in the axial direction of the rotation shaft 23.

In the above embodiment, the end wall 30e of the bearing holder 30a does not have to be arranged in the refrigerant passages 70.

In the above embodiment, a separate component may be provided to function as the striking wall.

In the above embodiment, the number of the refrigerant passages 70 is not particularly limited.

In the above embodiment, there may be two or more projections 70b extending in the axial direction of the rotation shaft 23 and located in the radially outer region of each refrigerant passage 70.

The projection 70b may be formed integrally with or discretely from the rotor core 24a.

In the above embodiment, the rotor core 24a does not have to include the projections 70b. The refrigerant passage 70 may each be, for example, a simple bore having a round cross-section.

In the above embodiment, the inner circumferential surfaces of the first end plate 81 and the second end plate 82 may be located at the outer side of the projections 70b in the radial direction of the rotation shaft 23.

In the above embodiment, the shapes of the first communication port 81h and the second communication port 82h are not particularly limited as long as the inner circumference of the first end plate 81 defining the first communication port 81h or the inner circumference of the second end plate 82 defining the second communication port 82h is located at the inner side of the hypothetical circle R1 in the radial direction of the rotation shaft 23.

Further, it is only required that the radially outer region (first radially outer region) of the first opening 701 be covered by the first end plate 81, and the radially outer region (second radially outer region) of the second opening 702 be covered by the second end plate 82.

In the above embodiment, the clearance between the bearing holder 30a and the rotation shaft 23 does not have to be in communication with each of the refrigerant passages 70.

In the above embodiment, the filler 51 may be omitted, and the first region Z1 and the second region Z2 may be in communication through the gap between the passage formation portion 12c and the cluster block 50.

In the above embodiment, the compression unit 18, the electric motor 19, and the motor drive circuit 40 do not have to be arranged in this order in the axial direction of the rotation shaft 23. For example, the inverter cover 41 may be fixed to an outer wall of the motor housing 12. In this case, the motor drive circuit 40 is accommodated in an accommodation compartment formed between the outer wall of the motor housing 12 and the inverter cover 41.

In the above embodiment, the compression unit 18 may be of, for example, a piston type or a vane type.

The present examples and embodiments are to be considered as illustrative and not restrictive, and the invention is not to be limited to the details given herein, but may be modified within the scope and equivalence of the appended claims.

The invention claimed is:

1. A motor-driven compressor comprising:

a compression unit;

an electric motor including a rotation shaft coupled to the compression unit, a rotor rotated integrally with the rotation shaft and including a rotor core, and a stator surrounding the rotor, wherein rotation of the rotation shaft drives the compression unit, the stator includes a stator core, which is provided with teeth, and a coil, which is arranged in a slot between the teeth, the coil includes a first coil end, which is located at a compression unit side, and a second coil end, which is located at an opposite side of the compression unit side, the rotor core includes a plurality of refrigerant passages extending through the rotor core along an axial direction of the rotation shaft, each of the refrigerant passages includes a first opening that opens in the compression unit side, and the first opening includes a first radially outer region located at an outer side of the first opening in the radial direction of the rotation shaft, wherein a hypothetical circle in the radial direction of the rotation shaft lies along outermost portions of the refrigerant passages;

a motor drive circuit that drives the electric motor;

a housing that accommodates the electric motor and the compression unit, wherein the stator is fixed to an inner surface of the housing, the housing has an interior including a first region in which the first coil end is located and a second region in which the second coil end is located, the first region and the second region are in communication through the refrigerant passage of the rotor core, and the housing includes a suction port connected to an external refrigerant circuit, wherein the suction port opens in the second region; and a first end plate arranged on a first region side end of the rotor core, wherein the first end plate includes a first communication port, wherein an outer diameter of the first communication port is an inner diameter of the first end plate, wherein the first region and the refrigerant passages are in communication through the first opening and the first communication port, and the inner diameter of the first end plate is smaller than a diameter of the hypothetical circle so that the first radially outer region is covered by the first end plate.

2. The motor-driven compressor according to claim 1, further comprising a second end plate arranged on a second region side of the rotor core, wherein the second end plate includes a second communication port, wherein each of the refrigerant passages includes a second opening at an opposite side of the first opening, the second opening includes a second radially outer region located at an outer side of the second opening in the radial direction of the rotation shaft, the second region and the refrigerant passages are in communication through the second opening and the second communication port, and the second radially outer region is covered by the second end plate.

3. The motor-driven compressor according to claim 1, wherein each of the refrigerant passages includes a radially inner region located at an inner side of the refrigerant passage in the radial direction of the rotation shaft, and a striking wall is arranged in the radially inner region.

4. The motor-driven compressor according to claim 3, further comprising:

a bearing that supports the rotation shaft; and a bearing holder that holds the bearing, wherein the bearing holder is arranged in the housing, wherein the striking wall is formed by an end wall of the bearing holder.

5. The motor-driven compressor according to claim 4, wherein a clearance between the bearing holder and the rotation shaft is in communication with the refrigerant passages.

6. The motor-driven compressor according to claim 1, wherein the refrigerant passages are arranged in a circumferential direction of the rotation shaft.

7. The motor-driven compressor according to claim 1, wherein each of the refrigerant passages includes a radially outer region located at an outer side of the refrigerant passage in the radial direction of the rotation shaft, the rotor core includes a projection, and the projection is located in the radially outer region and extends along the axial direction of the rotation shaft.

8. The motor-driven compressor according to claim 1, wherein the compression unit, the electric motor, and the motor drive circuit are arranged in this order along the axial direction of the rotation shaft.

* * * * *